United States Patent
Erler et al.

(10) Patent No.: US 8,834,800 B2
(45) Date of Patent: Sep. 16, 2014

(54) APPARATUS FOR THE TREATMENT OF SOLIDS AND/OR GASES

(75) Inventors: Rene-Arndt Erler, Frankfurt (DE); Michael Missalla, Oberursel (DE); Rolf Gilgen, Koenigstein (DE)

(73) Assignee: Outotec Oyj, Espoo (FI)

( * ) Notice: Subject to any disclaimer, the term of this patent is extended or adjusted under 35 U.S.C. 154(b) by 249 days.

(21) Appl. No.: 13/503,073

(22) PCT Filed: Oct. 20, 2010

(86) PCT No.: PCT/EP2010/006405
§ 371 (c)(1),
(2), (4) Date: Jul. 4, 2012

(87) PCT Pub. No.: WO2011/047848
PCT Pub. Date: Apr. 28, 2011

(65) Prior Publication Data
US 2012/0269688 A1 Oct. 25, 2012

(30) Foreign Application Priority Data

Oct. 21, 2009 (DE) .......................... 10 2009 050 165

(51) Int. Cl.
*B01J 8/18* (2006.01)
*B01J 8/00* (2006.01)
*B04C 5/04* (2006.01)

(52) U.S. Cl.
CPC .......... *B01J 8/18* (2013.01); *B01J 2208/00761* (2013.01); *B01J 8/0055* (2013.01); *B01J 8/0015* (2013.01); *B04C 5/04* (2013.01)
USPC ........................................................ 422/147

(58) Field of Classification Search
CPC ........ B01J 8/0055; B01J 8/1863; B01J 8/388; B01J 2208/0761; B01J 2208/00769
USPC .......................................................... 422/147
See application file for complete search history.

(56) References Cited

U.S. PATENT DOCUMENTS

| 5,771,844 A | 6/1998 | Dietz |
| 6,015,539 A | 1/2000 | Schmidt et al. |
| 6,322,601 B1 | 11/2001 | Semedard et al. |
| 6,938,780 B2 * | 9/2005 | Baglione et al. .............. 209/717 |
| 2004/0074814 A1 | 4/2004 | Baglione et al. |
| 2008/0216655 A1 | 9/2008 | Vimalchand et al. |

FOREIGN PATENT DOCUMENTS

| DE | 202005014174 U1 | 11/2005 |
| DE | 602 04 477 T2 | 3/2006 |

(Continued)

OTHER PUBLICATIONS

European Patent Office, International Search Report in International Patent Application No. PCT/EP2010/006405 (May 11, 2011).

*Primary Examiner* — Lessanework Seifu
(74) *Attorney, Agent, or Firm* — Leydig, Voit & Mayer, Ltd.

(57) ABSTRACT

An apparatus for the treatment of at least one of solids and gases includes a fluidized-bed reactor configured to fluidize the solids using fluidizing gas and to at least one of thermally and chemically treat the solids. A centrifugal separator is configured to separate the fluidizing gas and the solids from each other. A transfer duct connects the fluidized-bed reactor and centrifugal separator to each other. The transfer duct has a trapezoidal cross-section in a vertical direction and in a horizontal direction. The transfer duct branches off from the fluidized bed reactor with a cross-section having a horizontal dimension that is greater than a vertical dimension. The cross-section of the transfer duct expands downwards in the vertical direction from the fluidized-bed reactor to the centrifugal separator. The cross-section of the transfer duct tapers in the horizontal direction from the fluidized-bed reactor towards the centrifugal separator.

7 Claims, 2 Drawing Sheets

(56) References Cited

FOREIGN PATENT DOCUMENTS

| EP | 0475252 | A1 | 3/1919 |
| EP | 0346748 | A1 | 12/1989 |
| EP | 0861208 | B1 | 11/2000 |
| EP | 1308213 | A1 | 5/2003 |
| WO | WO 2011032620 | A1 | 3/2011 |

\* cited by examiner

APPARATUS FOR THE TREATMENT OF SOLIDS AND/OR GASES

CROSS-REFERENCE TO PRIOR APPLICATIONS

This application is a U.S. National Phase application under 35 U.S.C. §371 of International Application No. PCT/EP2010/006405, filed on Oct. 20, 2010, and claims benefit to German Patent Application No. DE 10 2009 050 165.7, filed on Oct. 21, 2009. The International Application was published in English on Apr. 28, 2011 as WO 2011/047848 under PCT Article 21(2).

FIELD

The present invention relates to an apparatus for the treatment of solids and/or gases, comprising a fluidized-bed reactor in which the solids are fluidized by means of fluidizing gas and are thermally and/or chemically treated, and comprising a centrifugal separator in which gas and solids are separated from each other, wherein the fluidized-bed reactor is connected with the centrifugal separator via a transfer duct.

BACKGROUND

Apparatuses have long since been known for example for calcining solids (cf. EP 0 861 208 B1). In a fluidized-bed reactor the solids are treated with hot gases and calcined. The gas/solids mixture is discharged from the reactor via a transfer duct and separated in a centrifugal separator, in particular a cyclone, wherein the gases are withdrawn upwards and the solids are withdrawn downwards from the centrifugal separator. It was found out, however, that the formation of streaks at the inlet of the centrifugal separator has a negative influence on its segregation behavior.

In existing plants, the conduits merely were designed according to the requirements of the flow velocity at the inlet of the cyclone, whereas the formation of streaks was not taken into account.

U.S. Pat. No. 6,322,601 for example describes an inlet conduit for a cyclone, which is defined by an extrados face and an intrados face, wherein the intrados face is curved such that tangents mentally applied thereto intersect the extrados face at certain points. With the curved shape of the intrados face solid particles should be directed onto the extrados face and into the cyclone, in order to improve the acceleration efficiency. For further optimization, the intrados face can include grooves for guiding the solids flow. The flow velocity should be optimized thereby. A formation of streaks in the upper part of the cyclone is, however, not avoided.

SUMMARY

In an embodiment, the present invention provides an apparatus for the treatment of solids and/or gases. A fluidized-bed reactor is configured to fluidize solids using fluidizing gas and to at least one of thermally and chemically treat the solids. A centrifugal separator is configured to separate the fluidizing gas and the solids from each other. A transfer duct connects the fluidized-bed reactor and centrifugal separator to each other. The transfer duct has a trapezoidal cross-section in a vertical direction and in a horizontal direction. The transfer duct branches off from the fluidized bed reactor with a cross-section having a horizontal dimension that is greater than a vertical dimension. The cross-section of the transfer duct expands downwards in the vertical direction from the fluidized-bed reactor to the centrifugal separator. The cross-section of the transfer duct tapers in the horizontal direction from the fluidized-bed reactor towards the centrifugal separator.

BRIEF DESCRIPTION OF THE DRAWINGS

The present invention will be described in even greater detail below based on the exemplary figures. The invention is not limited to the exemplary embodiments. Features described and/or represented in the various figures can be used alone or combined in embodiments of the present invention. Other features and advantages of various embodiments of the present invention will become apparent by reading the following detailed description with reference to the attached drawings which illustrate the following.

DETAILED DESCRIPTION

Figure 1:
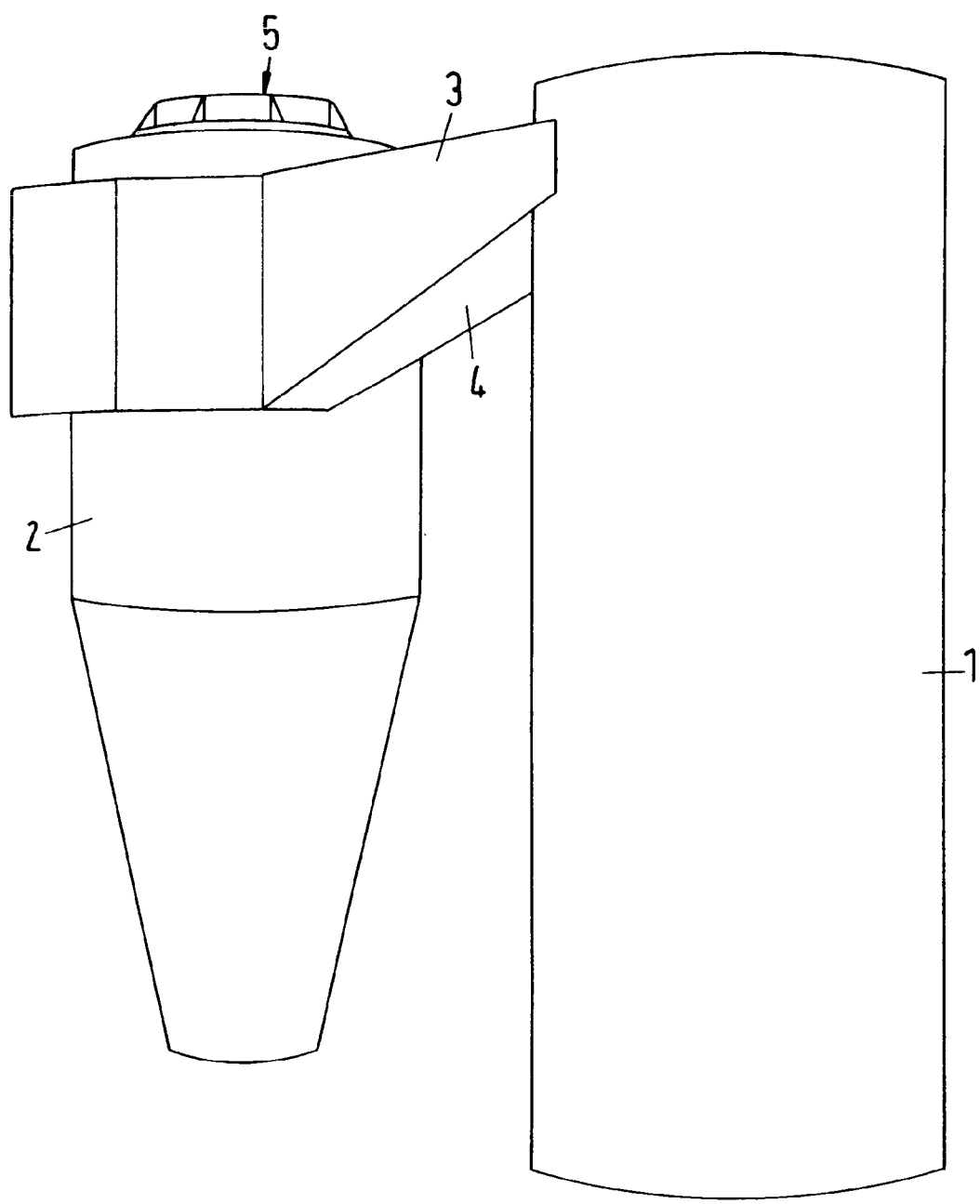
FIG. 1 shows a schematic view of an apparatus in accordance with an embodiment of the invention.
Figure 2:
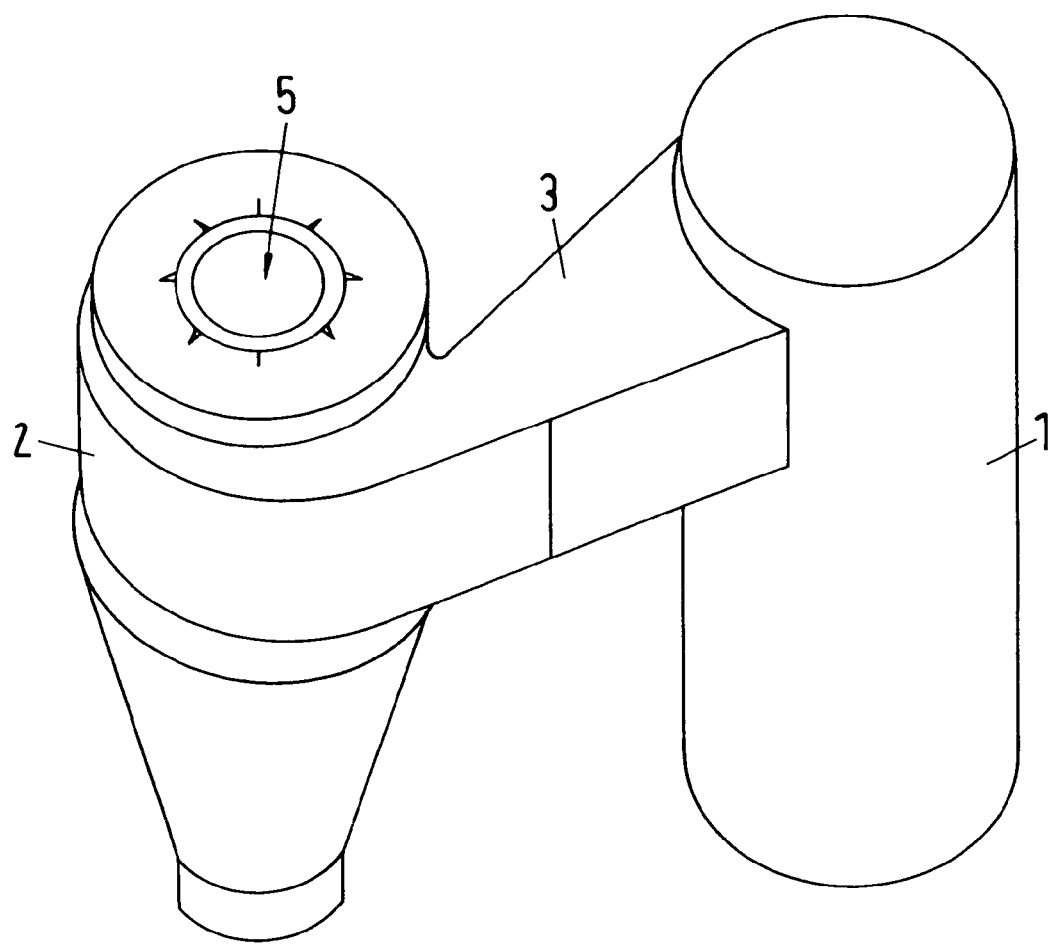
FIG. 2 shows another schematic view of the apparatus in accordance with an embodiment of the invention.

Measurements in existing plants with circulating fluidized bed have confirmed that the influence of the formation of streaks on the segregation behavior of the cyclone is not negligible and chiefly depends on the formation of the inlet flow. Streaks which are formed in the upper part of the inlet conduit and therefore cover the uppermost boundary layer of the centrifugal separator must be avoided.

In an embodiment, the present invention avoids the formation of a streak extremely loaded with solids in the upper region of the centrifugal separator.

In an apparatus according to an embodiment of the present invention the transfer duct branches off from the fluidized-bed reactor with a cross-section whose horizontal dimension is greater than the vertical dimension and the cross-section of the transfer duct expands downwards in the vertical direction from the fluidized-bed reactor to the centrifugal separator.

The design of the inlet duct into the centrifugal separator is particularly important for its segregation behavior. Therefore, embodiments of the present invention minimize the disadvantageous effect of the impulse directed upwards in solids systems delivering downwards. With these embodiments, the effective length of the inlet duct is increased and the formation of the streak in the lower part of this duct thereby is supported. In addition, the construction height of the apparatus delivering upwards can be reduced with embodiments of the present invention and in addition a reentry into the duct of the streak formed in the upper part of the cyclone can be prevented, which leads to a distinctly lower material wear.

To achieve a uniform flow, the lower boundary surface of the transfer duct is inclined downwards towards the centrifugal separator in accordance with a preferred embodiment of the invention.

When, as provided in accordance with a preferred embodiment, the cross-section of the transfer duct is smaller at the inlet of the centrifugal separator than at the outlet of the fluidized-bed reactor, the velocity of the gas stream can be increased.

In accordance with an embodiment of the invention, the cross-section of the transfer duct is smaller at the outlet of the fluidized-bed reactor than at the inlet of the centrifugal separator by a factor of 1.1 to 2.5, in particular 1.2 to 1.8. The factor is calculated from the ratio (cross-section of the transfer duct at the outlet of the fluidized-bed reactor)/(cross-section of the transfer duct at the inlet of the centrifugal separator).

Preferably, the cross-section of the transfer duct tapers in horizontal direction from the fluidized-bed reactor to the centrifugal separator.

In accordance with an embodiment of the invention, the transfer duct has a trapezoidal cross-section in a vertical and/or a horizontal direction, whereby manufacture is facilitated.

The apparatus in accordance with an embodiment of the invention can be used for dedusting streams with a high solids load, e.g. in a calcining plant for the treatment of alumina. Preferably, the centrifugal separator is a recirculation cyclone of a circulating fluidized bed. In other embodiments, the present invention provides a use of the apparatus in other centrifugal separators.

Referring to the Figures, an apparatus according to an embodiment of the invention comprises a fluidized-bed reactor 1 and a centrifugal separator 2 configured e.g. as dedusting cyclone, which are connected with each other via a transfer duct 3.

The outlet opening of the fluidized-bed reactor 1 is formed as a transverse slot, so that at its inlet the cross-section of the transfer duct 3 is greater in horizontal direction than in vertical direction. The outlet region of the fluidized-bed reactor 1 therefore is relatively flat with the same outlet area, so that the height of the fluidized-bed reactor 1 can be configured lower as compared to the conventional use of a rectangular, high transfer duct 3.

As can be taken from the Figures, the transfer duct 3 has a substantially trapezoidal cross-section both in a horizontal and in a vertical direction, with the width of the transfer duct 3 being reduced towards the centrifugal separator 3. In the vertical direction, however, the transfer duct 3 is inclined downwards towards the centrifugal separator 2, so that its cross-section is increased.

In general, the cross-section at the inlet of the centrifugal separator 2 is smaller by the factor of 1.8 to 1.2 than the cross-section at the outlet of the fluidized-bed reactor 1, so that the gas velocity is raised.

By the design of the transfer duct 3 it is achieved that streaks are formed in the lower portion of the transfer duct 3, whereas the penetration of upwardly directed solids into the transfer duct 3 is minimized. A formation of streaks in the upper boundary layer of the centrifugal separator 2 is reliably avoided or reduced, and the separation properties of the centrifugal separator 2 are improved.

The solids can be recirculated from the centrifugal separator 2 into the fluidized-bed reactor 1 (circulating fluidized bed) or be supplied to another treatment stage. Via an opening 5, the gas stream is withdrawn from the top of the centrifugal separator 2.

Embodiments of the present invention can be employed in all types of centrifugal separators to increase efficiency, especially in cyclones with high input loads, as they are used in fluidized-bed technology e.g. for calcining alumina, for dedusting in roasting plants, or the like.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS 1 fluidized-bed reactor
2 centrifugal separator
3 transfer duct
4 lower boundary surface
5 opening

The invention claimed is:

1. An apparatus for the treatment of solids and/or gases, comprising:
 a fluidized-bed reactor configured to fluidize solids using fluidizing gas and to at least one of thermally and chemically treat the solids;
 a centrifugal separator configured to separate the fluidizing gas and the solids from each other; and
 a transfer duct having four sides and connecting the fluidized-bed reactor and centrifugal separator to each other, the transfer duct having a trapezoidal cross-section in a vertical direction and in a horizontal direction, wherein the transfer duct branches off from the fluidized bed reactor with a cross-section having a horizontal dimension that is greater than a vertical dimension, the cross-section of the transfer duct expanding downwards in the vertical direction from the fluidized-bed reactor to the centrifugal separator and the cross-section of the transfer duct tapering in the horizontal direction from the fluidized-bed reactor towards the centrifugal separator.

2. The apparatus according to claim 1, wherein a lower boundary surface of the transfer duct is inclined downwards towards the centrifugal separator.

3. The apparatus according to claim 1, wherein the cross-section of the transfer duct is smaller at the inlet of the centrifugal separator than at the outlet of the fluidized-bed reactor.

4. The apparatus according to claim 3, wherein the cross-section of the transfer duct is smaller at the inlet of the centrifugal separator than at the outlet of the fluidized-bed reactor by a factor of 1.1 to 2.5.

5. The apparatus according to claim 1, wherein the centrifugal separator is a recirculation cyclone of a circulating fluidized bed.

6. The apparatus according to claim 1, wherein the cross-section of the transfer duct expands continuously downwards in the vertical direction from the fluidized-bed reactor to the centrifugal separator.

7. The apparatus according to claim 1, wherein the cross-section of the transfer duct tapers continuously in the horizontal direction from the fluidized-bed reactor to the centrifugal separator.

* * * * *